Patented June 18, 1935

2,005,317

UNITED STATES PATENT OFFICE 2,005,317

PRODUCT OF 2-ACETYLAMINO-3-CHLORANTHRAQUINONE

Fritz Helwert and Albert Palm, Ludwigshafen-on-the-Rhine, Germany, assignors to General Aniline Works, Inc., New York, N. Y., a corporation of Delaware No Drawing. Application August 31, 1934, Serial No. 742,354. In Germany September 20, 1933

6 Claims. (Cl. 260—60)

The present invention relates to a process for producing 2-acetylamino-3-chloranthraquinone.

We have found that pure 2-acetylamino-3-chloranthraquinone can be obtained in a very advantageous manner by subjecting the mixtures of isomeric chloraminoanthraquinones obtainable by the treatment of 2-(3'-amino-4'-chlorbenzoyl)-benzoic acid with acid condensing agents, as for example the mixtures obtainable according to the German Patent No. 148,110, to acetylation in suitable solvents or suspension agents, for example nitrobenzene or concentrated sulphuric acid, the difficultly soluble 2-acetylamino-3-chloro compounds being separated from the acetylation mixture. The process is rendered very simple if the condensation of the 2-(3'-amino-4'-chlorbenzoyl)-benzoic acid, the acetylation of the mixture of the resulting chloraminoanthraquinones and the separation of the 2-acetylamino-3-chloranthraquinone are carried out without isolating the products formed in the intermediate stages.

In the said German Patent No. 148,110, there is stated that by the condensation of 2-(3'-amino-4'-chlorbenzoyl)-benzoic acid with an acid condensing agent a uniform product be obtained. This statement is not correct. As a matter of fact, two isomeric compounds are formed, namely 2-amino-3-chloranthraquinone and 1-amino-2-chloranthraquinone. According to the present process, the separation of the aminochloranthraquinones is carried out by means of their acetyl compounds. This method is based upon the surprising fact that 2-acetylamino-3-chloranthraquinone is less soluble in organic solvents and more resistant against diluted sulphuric acid than the isomeric 1-acetylamino-2-chloranthraquinone. The 2-acetylamino-3-chloranthraquinone is thus obtainable in a simple manner in pure state. It is not necessary to separate the isomeric chloraminoanthraquinones before the acetylating treatment. The ring closure according to the process described in the said German Patent No. 148,110 and the acetylating treatment may be carried out in one operation. Obviously, this method of working is very advantageous. The 1-acetylamino-2-chloranthraquinone formed at the same time may, if desired, be isolated from the solution in the organic solvent, for example nitrobenzene, as such or, if the separation is carried out by means of diluted sulphuric acid, in the form of 1-amino-2-chloranthraquinone.

The following examples will further illustrate how the said invention may be carried out in practice but the invention is not restricted to these examples. The parts are by weight.

Example 1

100 parts of the mixture of isomeric chloraminoanthraquinones obtainable according to the said German Patent No. 148,110, 500 parts of nitrobenzene and 70 parts of acetyl chloride are heated to from 105° to 110° C. while stirring and kept at the said temperature until free amine can no longer be detected, which is usually the case after from half to one hour. After cooling, the reaction mixture is filtered by suction and the residue washed with nitrobenzene and worked up by removing the nitrobenzene by means of steam distillation or by washing with ethyl alcohol and drying the residue. The crystalline yellow product thus obtained in a good yield is pure 2-acetylamino-3-chloranthraquinone. Pure 2-amino-3-chloranthraquinone may be obtained therefrom by saponification with 80 per cent sulphric acid.

Example 2

100 parts of the mixture of isomeric chloraminoanthraquinones obtainable according to the said German Patent No. 148,110 are introduced at from 20° to 25° C., into 1000 parts of 10 per cent oleum. When dissolution is complete, there are introduced at 20° C. 150 parts of acetic anhydride during the course of an hour while raising the temperature to 30° C. After further increasing the temperature to 40° C., the whole is kept for about an hour at the said temperature and then allowed to cool. 1200 parts of 62.5 per cent sulphuric acid are slowly added at a temperature not exceeding about 20° C. The precipitate obtained is stirred with cold water, filtered by suction, washed until neutral and dried.

The yellow product thus obtained in a good yield is pure 2-acetylamino-3-chloranthraquinone.

Example 3

150 parts of 2-(3'-amino-4'-chlorbenzoyl)-benzoic acid are introduced during the course of an hour at from 165° to 170° C., into 750 parts of sulphuric acid monohydrate, the whole then being kept at the said temperature for an hour. After cooling, 700 parts of 23 per cent oleum are added and then during the course of an hour 225 parts of acetic anhydride are allowed to flow in, the temperature being raised at the same time from 20° to 30° C. After raising the temperature further to 40° C., the whole is kept at the said temperature for an hour. After cooling, 1800 parts of 62,5 per cent sulphuric acid are added slowly at a temperature not exceeding about 20° C. The precipitate is filtered off by suction and worked up in the manner described in Example 2.

What we claim is:

1. A process for producing 2-acetylamino-3-chloranthraquinone which comprises subjecting the mixtures of isomeric chloraminoanthraquinones obtainable by the treatment of 2-(3'-amino-4'-chlorbenzoyl)-benzoic acid with acid condensing agents, to acetylation and isolating the 2-acetylamino-3-chloranthraquinone.

2. A process for producing 2-acetylamino-3-chloranthraquinone which comprises subjecting the mixtures of isomeric chloraminoanthraquinones obtainable by the treatment of 2-(3'-amino-4'-chlorbenzoyl)-benzoic acid with acid condensing agents, to acetylation in the presence of a diluent and isolating the 2-acetylamino-3-chloranthraquinone.

3. A process for producing 2-acetylamino-3-chloranthraquinone which comprises subjecting the mixtures of isomeric chloraminoanthraquinones obtainable by the treatment of 2-(3'-amino-4'-chlorbenzoyl)-benzoic acid with acid condensing agents, to acetylation in the presence of sulphuric acid and isolating the 2-acetylamino-3-chloranthraquinone.

4. A process for producing 2-acetylamino-3-chloranthraquinone which comprises subjecting the mixtures of isomeric chloraminoanthraquinones obtainable by the treatment of 2-(3'-amino-4'-chlorbenzoyl)-benzoic acid with acid condensing agents, to acetylation in the presence of nitrobenzene and isolating the 2-acetylamino-3-chloranthraquinone.

5. A process for producing 2-acetylamino-3-chloranthraquinone which comprises subjecting the mixtures of isomeric chloraminoanthraquinones obtainable by the treatment of 2-(3'-amino-4'-chlorbenzoyl)-benzoic acid with acid condensing agents, to acetylation in the presence of a diluent and isolating the 2-acetylamino-3-chloranthraquinone by washing with organic solvents.

6. A process for producing 2-acetylamino-3-chloranthraquinone which comprises subjecting the mixtures of isomeric chloramino anthraquinones obtainable by the treatment of 2-(3'-amino-4'-chlorbenzoyl)-benzoic acid with acid condensing agents, to acetylation in the presence of a diluent and isolating the 2-acetylamino-3-chloranthraquinone by crystallization from diluted sulphuric acid.

FRITZ HELWERT.
ALBERT PALM.